Dec. 15, 1970     E. P. LEE ET AL     3,546,965

DEVICE FOR CHANGING THE TIMING OF CAM DRIVEN LINKAGES

Original Filed July 12, 1967     10 Sheets-Sheet 1

INVENTORS
EDWARD P. LEE
EUGENE H. LOMBARDI
RALPH A. MONTES
OSCAR W. STOECKLI

Cameron, Kerkam & Sutton
ATTORNEYS

Dec. 15, 1970  E. P. LEE ET AL.  3,546,965
DEVICE FOR CHANGING THE TIMING OF CAM DRIVEN LINKAGES
Original Filed July 12, 1967  10 Sheets-Sheet 7

INVENTORS
EDWARD P. LEE
EUGENE H. LOMBARDI
RALPH A. MONTES
OSCAR W. STOECKLI

Cameron, Kerkam & Sutton
ATTORNEYS

INVENTOR
EDWARD P. LEE
EUGENE H. LOMBARDI
RALPH A. MONTES
OSCAR W. STOECKLI

Cameron, Kerkam & Sutton
ATTORNEYS

FIG. 15

United States Patent Office 3,546,965
Patented Dec. 15, 1970

3,546,965
DEVICE FOR CHANGING THE TIMING OF CAM DRIVEN LINKAGES
Edward P. Lee, White Plains, Eugene H. Lombardi, Port Chester, Ralph A. Montes, White Plains, and Oscar W. Stoeckli, Rye, N.Y., assignors to General Foods Corporation, White Plains, N.Y., a corporation of Delaware
Original application July 12, 1967, Ser. No. 652,858, now Patent No. 3,470,996, dated Oct. 7, 1969. Divided and this application Apr. 3, 1969, Ser. No. 839,109
Int. Cl. F16h 53/08
U.S. Cl. 74—568                    9 Claims

ABSTRACT OF THE DISCLOSURE

A mechanism for changing the relative timing of cam driven linkages has a plurality of parallel shafts rotatably driven in timed relationship. A cam element having a pair of cam surfaces is mounted on each of the shafts in rotating and sliding engagement therewith. A yoke operated by a piston and cylinder is connected to the cam elements for reciprocating the cam elements on the shafts. The reciprocation causes a cam follower associated with each cam element to move from one cam surface to another thereby changing the relative timing of the cam driven linkages.

---

This application is a division of U.S. application Ser. No. 652,858, filed July 12, 1967, by Edward P. Lee et al., now Pat. No. 3,470,996.

BACKGROUND OF THE INVENTION

Field of the invention

This invention relates generally to storage devices and more particularly to a surge unit adapted to be disposed between a supplying machine and a consuming machine of a continuous manufacturing process such as, for example an automatic production line.

Description of the prior art

In manufacturing processes which require several steps in an ordered sequence, rarely does each processing operation have an identical operating rate and each step is frequently subjected to some degree of interruption due to normal operating procedure, accidents, or mechanical failure. While interruptions may be regular or random, planned or unplanned, experience has shown that frequent interruptions of short duration are a major part of the total time lost in many manufacturing processes.

Where a conveyor is used to transport discrete production units from one operating station to the next, the customary solution has been to allow units to accumulate on the conveyor whenever an interruption occurs. With the advent of higher speed equipment for processing, conveyor storage has been proved inadequate because of the long lengths required to store the production units that accumulate during even short interruptions. Thus, when storage is restricted and production units pass rapidly from one step to the next, an interruption in any process step interacts with other steps which either supply it or depend upon it for their supply.

SUMMARY OF THE INVENTION

The capacity in a system to remove articles from a main conveyor when an excessive build-up or back-up occurs and store these articles until such time as the event causing the back-up is corrected, after which the articles are returned to the main conveyor at the point from which they were removed, is a highly desirable feature in that the rate of operation of different stations and interruptions that may occur at one or more stations do not interfere or interact with other operating stations, unless there is a prolonged disruption which would overburden the storage capacity of the surge unit.

Accordingly, it is a primary object of the present invention to provide a surge unit disposed between two operating stations of a continuous manufacturing process so as to provide an intermediate inventory or storage and supply station that minimizes interaction of one operating station on the other in the event of a breakdown or interruption of the process.

Another object of the present invention is to provide a surge unit disposed between two operating stations of a continuous manufacturing process that is adapted to automatically store or discharge production units as circumstances require.

A further object of the present invention is to provide a surge unit for a continuous manufacturing process which is economical in construction and efficient in operation.

These and other objects of the invention and their attendant advantages will be readily apparent from the following description. To this end, the invention will be described with relation to a production line adapted for handling food containers such as, for example, packages of cereal; however, it is not intended thereby to limit the scope of the invention.

In accordance with one embodiment of the invention, the surge unit comprises a secondary conveyor, which may be of a circulating type, disposed adjacent to an independently driven main conveyor connecting a supplying machine and a consuming machine. Each machine constitutes an independent operating station along an automatic production line adapted for processing dry cereal packed in rectangular containers. Gates disposed along the main conveyor and on opposite sides of the circulating conveyor in the direction of travel of the packages serve to group the containers and control means are provided to detect operating conditions along the belt and selectively energize the gates.

Whenever a normal condition is sensed, containers are passed from the supplying machine to the consuming machine without interruption. If an abnormal condition exists, the containers are either transferred for storage from the main conveyor to the circulating conveyor, or previously stored packages are supplied from the circulating conveyor to the main conveyor, depending on whether the abnormal condition detected is a result of a malfunction at the consuming machine or the supplying machine.

In accordance with another embodiment of the invention, the surge unit comprises a stacking device disposed adjacent the main conveyor between the supplying machine and the consuming machine. Control means are provided to monitor passage of the packages. When an abnormal condition exists at the consuming machine, a loading cycle is initiated which causes packages to be transferred from the main conveyor to an elevator. The packages are supported in an elevated position and, if the abnormal condition persists, a second group of packages is transferred from the main conveyor beneath the first group. The packages are thus stacked one on the other. When an abnormal condition exists at the supplying machine, a reverse operation takes place and the stacked packages are returned to the conveyor on a last in, first out basis.

While the specification concludes with claims particularly pointing out and distinctly claiming the subject matter of the present invention, it is believed the invention will be more clearly understood from the following detailed description thereof taken in connection with the accompanying drawings; however, it is to be expressly understood that these drawings are for the purposes of illustration only and are not to represent the full scope of the invention which is defined by the appended claims.

BRIEF DESCRIPTION OF THE DRAWINGS

In the drawings, wherein like characters identify like parts throughout the several views.

DESCRIPTION OF THE PREFERRED EMBODIMENTS

Figures 1, 2, 3A, 3B, 3C, 3D, 4A, 4B, 4C:
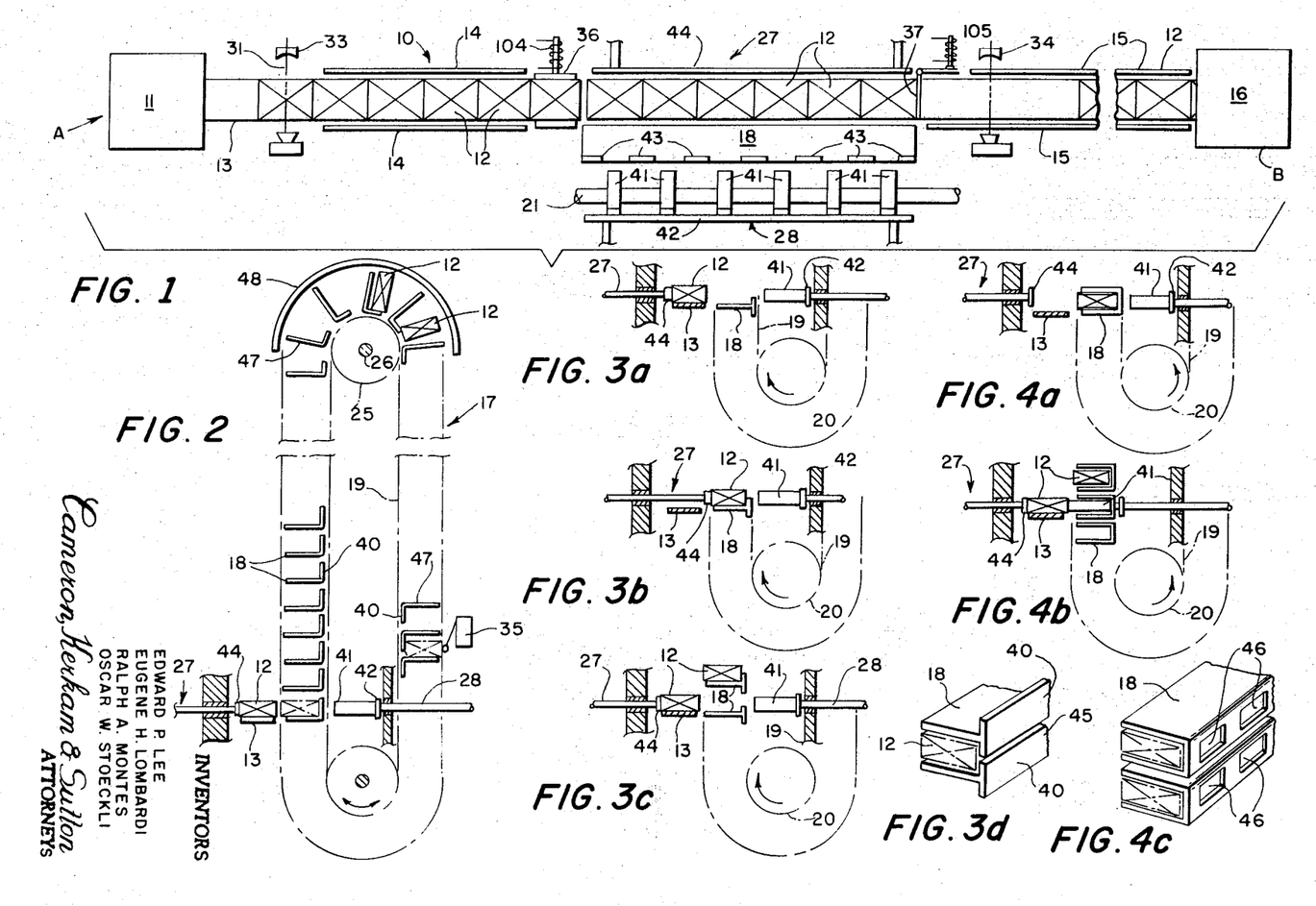
FIG. 1 is a diagrammatic representation of the invention illustrating a fragmentary portion of a conveyor disposed between two operating stations of a manufacturing process and a surge unit of the circulating conveyor type with its associated detecting elements and load transfer means.
FIG. 2 is a diagrammatic, side elevational view of a single unit circulating conveyor.
FIGS. 3a–3c illustrate a composite view of a loading cycle.
FIG. 3d is a fragmentary view of a storage shelf.
FIGS. 4a–4b illustrate a composite view of a loading cycle.
FIG. 4c is a fragmentary view of an alternate type storage shelf.

Referring to FIG. 1, there is diagrammatically illustrated a portion of a typical manufacturing production line 10 for the processing and packaging of dry cereal. Production line 10 includes a first operating station A at which is located a supplying machine 11. Machine 11 may be of the type that applies a final wrap to cereal boxes 12 and transfers the wrapped boxes onto belt conveyor 13. Boxes 12 supplied by machine 11 pass between a first set of side guides 14 and are transported along conveyor 13 past a second set of side guides 15 to a second operating station B at which is disposed consuming machine 16. Machine 16 performs another predetermined operation on the boxes 12 and may be of the type which packs several boxes into a single elongated package container. It will be apparent that the type of operation performed at either operating station is immaterial to the inventive concept which is, of course, not limited to the processing of food stuffs. Accordingly, details of machines 11 and 16 will not be described.

In accordance with the present invention, there is provided between the supplying machine 11 and consuming machine 16 a surge unit SU which forms an intermediate inventory operating station between A and B. In accordance with one embodiment of the invention, surge unit SU includes an independently driven circulating conveyor 17, the form of which is shown more clearly in FIG. 2.

Conveyor 17 comprises a plurality of flat surface, horizontally disposed storage shelves 18 carried at opposite ends by chain drive element 19. A pair of driven sprockets 20 are mounted on opposite sides of shaft 21 and intermittently driven by motor 22 through a conventional gear reduction unit 23 and Geneva indexing mechanism 24, sprockets 20 are driven in a forward or reverse direction to provide timed intermittent motion for loading or unloading of conveyor 17. Chain drive elements 19 are supported at the upper end of the circulating conveyor, as viewed in the drawings, by sprockets 25 mounted to shaft 26.

Shelves 18 extend lengthwise along the belt conveyor 13 and have their flat storage surfaces parallel with the surface of the conveyor belt and closely adjacent thereto so that boxes 12 may be advantageously transferred onto one of the shelves or removed therefrom by cam operated pusher elements 27 or 28 which are selectively actuated upon the occurrence of predetermined conditions.

To this end, cam operated pusher 27 is disposed to one side of the belt conveyor 13 and during a loading cycle is actuated to cause boxes on the belt conveyor to be swept from the conveyor onto an empty shelf. Advantageously, several boxes are loaded simultaneously onto a shelf, however, the number of boxes transferred upon cycling of the cam operated pusher 27 is determined by the setting of the sensing and logic controls. Cam operated pusher 28 is disposed to the other side of belt conveyor 13 and actuated during unloading cycles to transfer boxes from the shelves of the circulating conveyor 17 to the belt conveyor 13.

Figure 8:
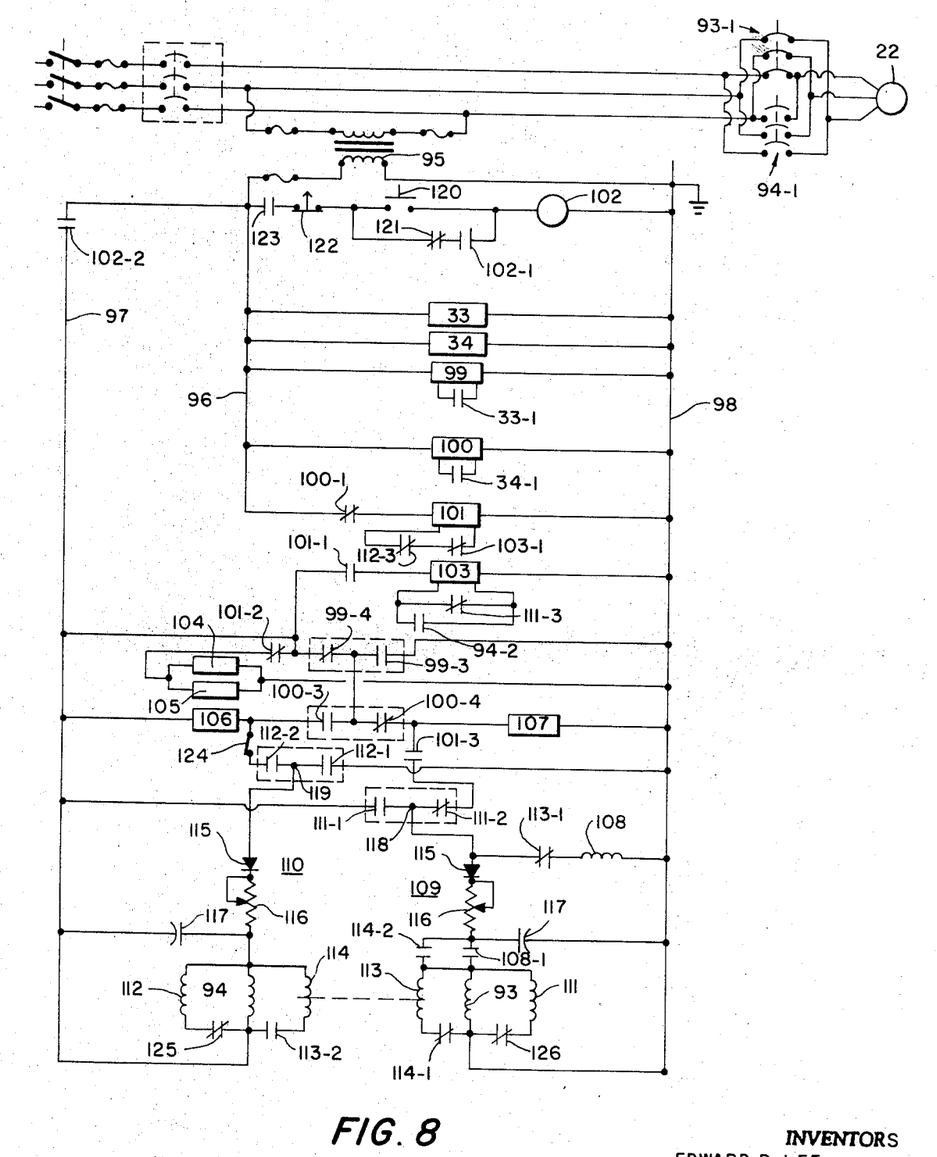
FIG. 8 is a control circuit diagram for the surge unit.

Operation of the circulating conveyor 17 is automatically controlled by the system control circuit, shown in FIG. 8 which provides the necessary synchronization between energization of the reversing motor 22 that drives the Geneva mechanism 24 and the cams 29 and 30 that actuate pushers 27 and 28. The control circuit includes a plurality of sensing units which, for simplicity, have been shown in FIGS. 1 and 2 in block form. Any conventional photoelectric or sonic detector or other sensing arrangement adapted to provide a control signal upon the occurrence of a predetermined condition can be used.

Referring to FIGS. 1 and 2, two of the sensing units 33 and 34 are positioned along the conveyor, while the third sensing unit 35 is associated with the circulating conveyor 17 to provide an indication when the available storage capacity of the conveyor has been reached. Sensing unit 33 is disposed upstream of conveyor 17 to detect boxes approaching the conveyor and sensing unit 34 is located downstream of conveyor 17 to detect the presence of the production units 12 on the belt conveyor 13 leading away from conveyor 17.

A first solenoid actuated gate or stop 36 is disposed along belt conveyor 13 at the point where boxes approach the conveyor 17. Gate 36 when actuated prevents production units from passing in front of the conveyor 17. A second solenoid actuated gate 37 is disposed along belt conveyor 13 beyond conveyor 17 so that when actuated, production units are prevented from passing beyond the conveyor.

In operation three cycles are provided, a pass through cycle, a load cycle and an unload cycle. The pass through cycle is established under normal operating conditions. Production units 12 supplied from machine 11 are stopped by gate 36 which is normally actuated to cause production units to accumulate on the belt conveyor. As the units stack-up, the first sensing unit 33 has its beam 31 interrupted to indicate the build-up or back-up of units. Advantageously, sensing unit 33 has incorporated therein a time delay which prevents its activation by the passage of a single production unit and preferably it is not activated unless it has been continuously interrupted for a predetermined period of at least two seconds.

So long as an abnormal condition is not detected by the second sensing unit 34, gate 36 opens to allow the group of production units to be carried by conveyor 13 against gate 37. Gate 36 then closes to allow another group of units to accumulate and gate 37 is opened to allow the first group to pass out and be carried by conveyor 13 to the consuming machine 16. Thus, in the pass through cycle, gates 36 and 37 are alternately opened and closed to stack production units in groups and pass the stacked units to the consuming machine.

The load cycle is illustrated in FIGS. 3a-3c. Where the sensing unit 34 detects an abnormal condition resulting in a back-up of packages from operating station B, thus indicating that the operation of the consuming machine 16 has been interrupted, and if maximum storage capacity of the circulating conveyor 17 has not been reached, gate 36 is opened to allow the production units to stack up against gate 37. The stacked units are transferred from conveyor 13 to a shelf 18 by actuation of pusher 27, after which conveyor 17 is indexed to bring another shelf 18 in position. Should the conveyor be filled to capacity, a condition which is detected by sensing unit 35, the control circuit disables the system.

FIGS. 4a and 4b illustrate the unload cycle which is established when sensing unit 33 does not detect an adequate supply from the supplying machine 11. If an abnormal back-up is not detected by sensing unit 34, pusher 28 is actuated to discharge a group of previously stored production units from a shelf 18 of the circulating conveyor on to the belt 13.

Referring again to FIGS. 1-4, shelves 18 generally include a flange or stop member 40 which serves to prevent production units from being pushed beyond a shelf when being transferred from the belt conveyor 13. To allow for reciprocatory movement of the pusher 28, stop member 40 may be of castellated form and unloading pusher 28 provided with a plurality of cooperating fingers 41 supported to bar 42. Each finger 41 is disposed to pass between raised portions 43 of the stop member 40. Loading pusher 27 may be fabricated in a manner similar to that of pusher 28 or, alternatively, may be provided with an elongated pusher element 44 which extends the length of a shelf 18.

As the shelves are loaded, the conveyor is indexed to step the shelves upwardly. The operation continues so long as the control circuit is in a load condition. As shelves 18 are carried around the upper shaft 26, the units on the shelf are transferred to the surface 47 of an adjacent shelf in the direction of travel of the conveyor 17. The reverse occurs when conveyor 17 is driven in the load cycle. Cover 48 serves to keep boxes from slipping off the shelves during the transfer from one shelf to another.

FIG. 3d illustrates an alternate construction for shelves 18. As shown, each shelf is T-shape in cross section so that, when carried by chain drive elements 19 adjacent shelves form a receiving pocket for production units, and provide a continuous clearance 45 for passage of pusher 28.

FIG. 4d illustrates another arrangement wherein each shelf is U-shape in cross section and is provided with a plurality of windows 46 at the rear. Each window or opening is aligned with a pusher finger 41 for transferring packages onto the belt conveyor. It should be apparent that the structural details of the various elements of the present invention are susceptible of various modifications which will suggest themselves to those skilled in the art.

Figure 5:
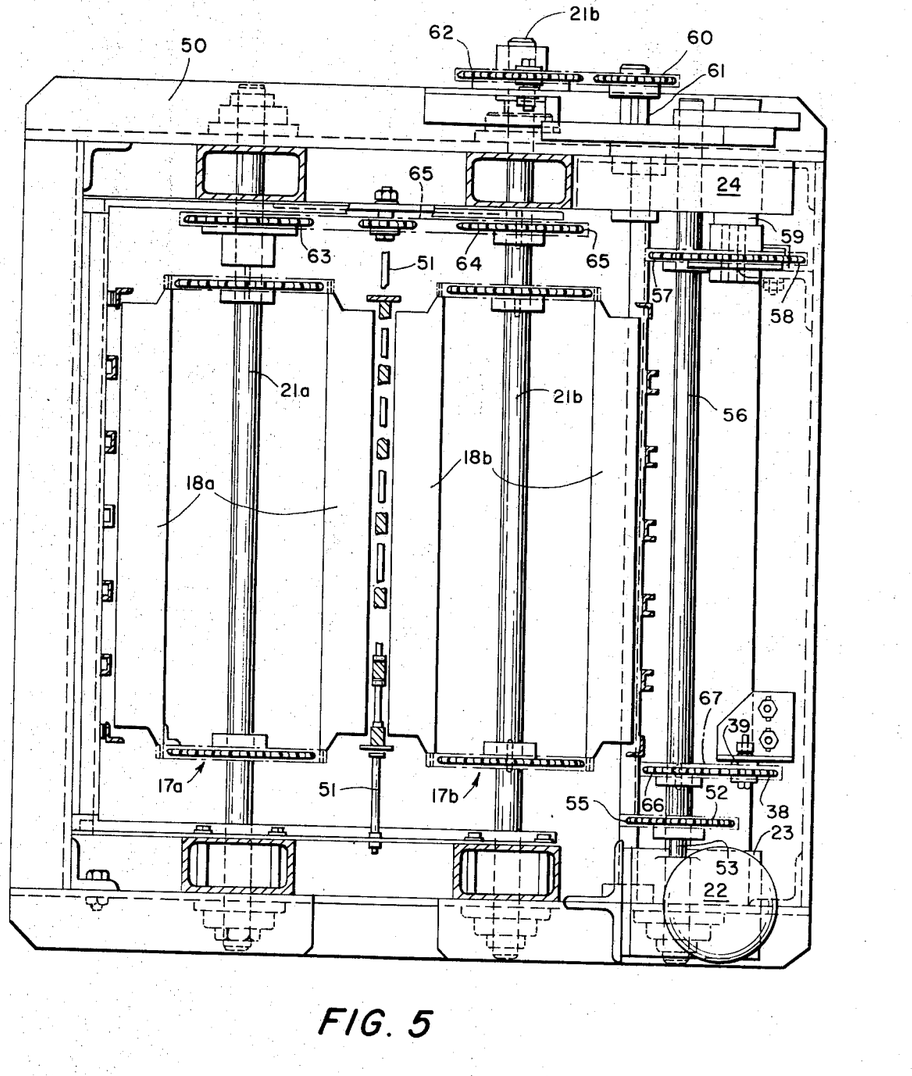
FIG. 5 is a plan view of a dual unit circulating conveyor surge unit with parts removed for clarity to particularly illustrate the power drive connections.
Figure 6:
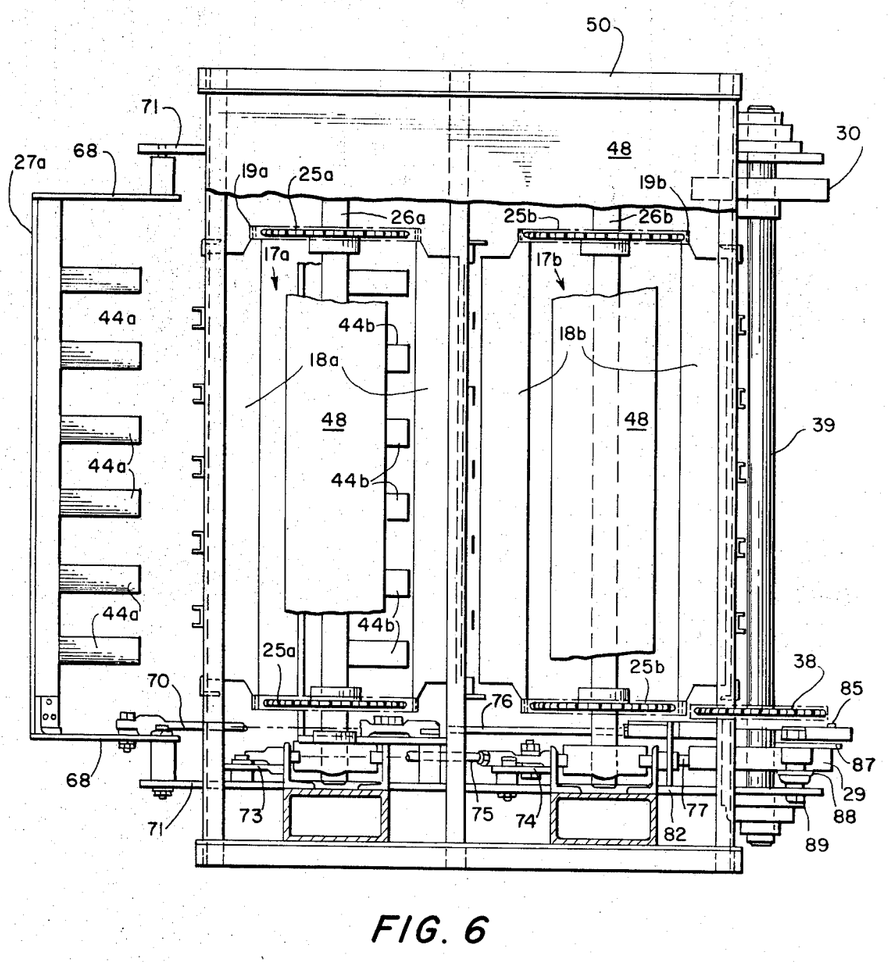
FIG. 6 is a plan view of a dual unit circulating conveyor surge unit with parts removed for clarity to particularly illustrate the relationship of the driving elements for the pushers.
Figure 7:
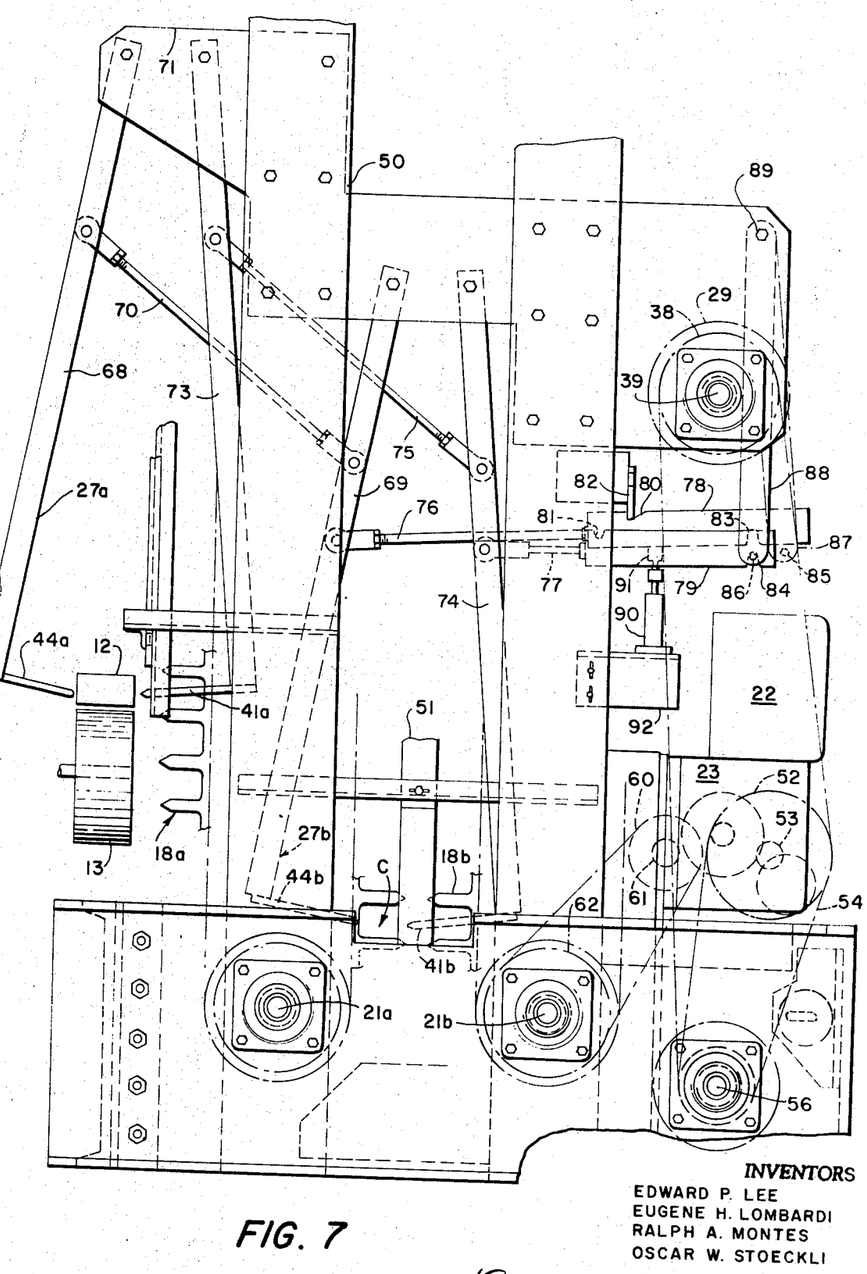
FIG. 7 is a fragmentary, elevational view showing the details of the pusher mechanism for a duel unit circulating conveyor in accordance with the present invention.

Advantageously, several circulating or loop conveyors may be cooperatively arranged one adjacent the other to increase the storage capacity of the system as more clearly illustrated by FIGS. 5-7. Each conveyor operates in the manner hereinbefore described and each is substantially identical in construction. Accordingly, like numerical reference characters identify like parts, and an alphabetical suffix a or b designates the particular circulating conveyor with which the part is associated. Character a designates the left conveyor, as viewed in the drawing, and character b designates the conveyor to the right. Conveyors 17a, 17b are mounted within frame work 50 on opposite sides of a separator bar 51. Advantageously, conveyod 17a is disposed so that its shelves 10a pass adjacent the main belt conveyor 13. Production units loaded onto shelves 18a are carried around the conveyor loop to a point C which corresponds to maximum capacity of conveyor 17a. From this position, if the abnormal conditions in the manurfacturing process are still present so that the surge unit is still loading from the main conveyor, production units on shelves 18a which have reached the postion at C are transferred to shelves 18b of conveyor 17b by operation of pusher 27b. Pusher 27b is ganged to and operated by the same linkage as pusher 27a.

Both loop conveyors are driven by motor 22 through speed reducer 23. To this end, as more clearly shown in FIG. 5, the output of speed reducer 23 is coupled through sprocket 52 on shaft 53 and chain drive element 54 to drive sprocket 55 mounted at one end of drive shaft 56. Sprocket 57 mounted at the other end of shaft 56 is operatively connected through a chain drive element to sprocket 58 on the input shaft 59 of the Geneva index mechanism 24. The output of the Geneva mechanism is taken from sprocket 60 keyed on output shaft 61 and applied to driven sprocket 62 mounted on drive shaft 21b of conveyor 17b. Shaft 21a is driven through sprocket 63 mounted thereon and operatively connected to sprocket 64 on shaft 21b by chain linkage 65.

Shaft 56 also has keyed thereto sprocket 66 which is drivingly connected through chain drive 67 to sprocket 38 keyed to shaft 39. Shaft 39 has mounted thereon operating cams 29 and 30 for actuating load pushers 27a, 27b and unload pushers 28a and 28b.

Referring to FIGS. 6 and 7, to effect simultaneous transfer of production units from belt 13 to conveyor 17a and from the last storage shelf of conveyor 17a at transfer point C to the first storage shelf 18b of conveyor 17b, pushers 27a and 27b form a parallel linkage comprising a pair of rock arms 68 and 69 and connecting rod 70. Rock arms 68 and 69 are each pivoted at their upper ends to a gusset 71 secured to frame 50 and are maintained in spaced parallel relationship by rod 70. At the lower ends of arms 68 and 69 are mounted the pusher fingers or pusher bar. Similarly, unload pushers 28a and 28b also utilize a parallel linkage formed by rock arms 73 and 74 connected by rod 75. Of course, if additional loops are desired, additional pushers and linkages may be provided and coupled to the existing pushers in a similar manner.

To effect transfer of production units, rock arm 69 is operatively connected to load bar 76 actuated by cams 29 and 30. A similar unload bar 77 is connected to rock arm 74 and is also cam actuated. Each of the bars 76 and 77 include a latch plate 78 and 79, respectively, having a forward notch 80, 81, adapted to engage latch 82 mounted to the frame 50 above the load and unload bars. Latch plates 78 and 79 include a rear slot 83, 84 within which is received operating pin 85, 86 carried by cam actuated arms 87, 88, respectively. Arms 87, 88 are pinned to frame 50, as at 89 so that they can swing freely on opposite sides of the cams for actuation of the load or unload pushers, as the case may be, when engaged by the operating surface of cams 29 and 30 mounted on shaft 39.

Release of the load bar 76 and unload bar 77 is effected by selective actuation of air cylinders 90, 91 mounted to plate 92 through the system control circuit. Actuating arms 87 and 88 require only a momentary pulse to begin their cycling and once one arm is cycled, the other arm and corresponding pusher mechanism is mechanically prevented from cycling by actuation of the air cylinder which locks the corresponding bar against its latch plate.

The system control circuit is illustrated in FIG. 8. All electrical requirements are supplied by a conventional 440 volt, 3 phase, 60 cycle line which is connected to reversible drive motor 22 through ganged contacts 93-3 or 94-3 of motor starter coil 93 or 94 respectively. Power distribution to the controls is provided through a stepdown transformer 95 having its primary winding connected across one phase of the input 3-phase line and its secondary winding connected to the control circuit. The secondary is connected at one end to "hot" wires 96 and 97 and at its other end to the main ground line or bus 98.

Wire 96 supplies operating current directly from transformer 95 to the sensing units 33 and 34 and time delay units 99, 100, 101 and 102, while the second "hot" wire 97 supplied operating current to time delay unit 103, operating coil of clamp solenoid 104, operating coil of gate solenoid 105, operating coils of the pusher latch solenoids or load air cylinder 106 and unload air cylinder 107, relay 108 and the DC power supply circuits 109, 110 which provide DC for motor starter coils 93 and 94, cycling relays 111 and 112 and latching relays 113 and 114.

Each DC power supply 109, 110 includes a conventional rectifier 115, adjustable resistor 116 and capacitor 117 connected to provide approximately 150 volts DC, no load, for operation of the starter coils 93 and 94 and approximately 65 volts DC, full load, for energization of cycling relays 111, and 112. The input of supply 109 is taken from the common terminal 118 of contacts 111-1 and 111-2 of cycling relay 111. Similarly, the input to supply 110 is connected to common terminal 119 of the normally open and normally closed contacts 112-1 and 112-2 cycling relay 112. In this manner, only one DC supply operates at a time to supply energizing power to the appropriate cycling and latching relays and motor starting coils. For convenience, cooperating normally open and normally closed contacts of a relay are enclosed by dash lines forming the phantom outline of a rectangle.

The start circuit includes a normally open push button 120 which is momentarily depressed for energization of the control circuit. Closure of switch 120 connects the energizing coil of time relay 102 across lines 96 and 98. Relay 102 includes a pair of holding contacts 102-1 arranged to bypass the starter switch 120 and apply holding current to the relay coil through the normally closed motor overload contacts 121, normally closed emergency stop switch 122 and interlock contacts 123 which are closed so long as power is applied to the main conveyor belt 13. A second pair of normally open contacts 102-2 of relay 102 are closed after a short delay which may be in the order of 4.5 seconds to energize line 97.

As hereinbefore described, sensing units 33, 34 may be of the photoelectric type and are directly energized from the secondary winding of transformer 95. However, operation of the cycling controls of the sensing units do not take place unless the beam has been interrupted for a predetermined period, which may be set, for example, at two seconds. Sensing unit 33 has its normally open contacts 33-1 cooperatively connected with the operating circuit of time delay relay 99 while the normally open contacts 34-1 of sensing unit 34 are cooperatively connected to the start circuit of time delay relay 100.

Relays 99 and 100 are of the type which include an adjustable delay period, the start of which is initiated by connecting the opearting circuit of the time delay relay to a bias or power source. If the starting circuit is deenergized before the delay period runs out, the timing circuit is recycled and the delayed contacts are not actuated. Such time delay relays are well known, and accordingly, the circuit details will not be described. One form of such relay suitable for use is commercially available from the Digit Company Inc. of Marblehead, Mass. and is marketed under the designation of Electronic Time Delay Relay Model No. 6001. Relays 101 and 103 are of the same type as relays 99 and 100.

Relay 101 has its starting circuit closed through contacts 112-3 of cycling relay 112 and contacts 103-1 of relay 103 both of which are normally closed and connected in series. AC power is applied through normally closed contacts 100-1. Relay 103 is connected across AC lines 97 and 98 through normally open contacts 101-1 of relay 101, while the starting circuit of relay 103 is connected through normally closed contacts 111-3 of cycling relay 111 or upon energization of the load started coil 94 and closure of its normally open contacts 94-2.

The control circuit provides for operation of the conveyor in three separate cycles; a pass through or normal cycle, a load cycle and an unload cycle. Cycling is achieved by selective energization of various relays which obviates the need for a separate timer for each cycle.

In the pass through cycle, time delay relays 101 and 103 are alternately energized as a low frequency oscillator to control energization of the clamp solenoid 104 and gate solenoid 105 which have their operating coils connected in parallel and serially through the normally closed contacts 101-2 to line 97.

In operation, assuming the conditions where unit 33 has its beam interrupted for the set period, indicating that a supply of production units is available on conveyor 13, and unit 34 does not have its beam interrupted, indicating that space beyond the conveyor is available, time delay relay 99 starts and times out. Since sensing unit 34 is not blocked, the timing cycle for relay 100 is not initiated, and relay 101 begins to time out since contacts 101-1 are closed and the timing circuit is energized through the closed contacts 112-3 and 103-1. Upon relay 101 timing out, contacts 101-1 close and since contacts 111-3 in the starting circuit of relay 103 are closed, relay 103 begins to time out. At the same time, the normally closed relay contacts 101-2 open to break the energizing circuit to solenoids 104 and 105.

When relay 103 times out, contacts 103-1 in the starting circuit of relay 101 open to cause relay 101 to recycle to its original position. This in turn reopens contacts 101-1 and drops out relay 103, which in turn reenergizes relay 101 upon closing of contacts 103-1, again energizing solenoids 104 and 105. The cycle is repeated so long as the initial conditions are maintained.

It should be apparent that the position of the stops or gates 36 and 37 controlled by solenoids 104 and 105 are alternate. That is, when the solenoids are deenergized, gate 36 stops packages at the inlet to the circulating conveyor 17 and gate 37 is open to release packages to the consuming machine 16 from the circulating conveyor. When energized, the reverse condition is established. During other cycles, solenoids 104 and 105 are locked in the appropriate position corresponding to the cycle.

The loading cycle is established when the belt conveyor 13 is filled with production units on both sides of the surge unit. In this condition, gate 36 is maintained open while the gate 37 is closed and relays 99 and 100 time out. This establishes the circuit to starter coil 94 and relay 112 which locks in for the cycle. The circuit to starter coil 94 can be traced from wire 97 through coil 94, DC supply 110, normally closed contact 112-2 of relay 112 normally closed limit switch 124 on conveyor 17, normally open (now closed) contact 100-3 of relay 100 and normally open (now closed) contact 99-3 of relay 99 to line 98.

Energization of starter coil 94 closes its contacts 94-1 causing motor 22 to begin to turn in the proper direction. Motor limit switch 125 closes thereby completing the energization circuit for relay 112, which in turn switches the input of DC supply 110 directly to line 98 through the normally open (now closed) contact 112-1. This locks in the cycle until limit switch 125 opens.

Upon opening of limit switch 125, coil 94 is still maintained energized through the original circuit path including the normally open (now closed) contacts 99-3 and 100-3. If time delay relays 99 and 100 have not changed, another cycle will begin. On the other hand, if either relay 99 or 100 is recycled due to unblocking of units 33 or 34, the unload cycle will stop and a different cycle will start.

To prevent overlapping of cycles in the event both sensing units are unblocked, causing both time delay relays 99 and 100 to be reversed, the load and unload circuits are mechanically and electrically interlocked, and only one pusher latch will engage at any one time until the end of the cycle when the latches switch position. Both coil 104 and 105 are maintained energized (inlet open, discharge closed) by contact 112–3 holding time delay relay 101 in the "start" position and starter coil contact 94–2 which maintains relay 103 timed out. Energizing coils 104 and 105 of the solenoids are energized through the normally closed contact 101–2 since the circuit to time delay relay 101 is broken upon timing out of relay 100 and opening of normally closed contact 100–1.

A pusher latch plate 78 or 79 is latched into the load position by the corresponding air cylinder 90 or 91 which is controlled by conventional air valve and pilot operated by solenoids 106 or 107. In the load position, the unload bar is latched in position. As the motor starts in a load direction, the load pusher 27 is swung in and out causing production units to be swept from the belt conveyor 13 to a chain supported shelf 18a. At the end of the cycle, an empty shelf is indexed into position and the cycle is ready to repeat. When all shelves on chain loop 17a are full, the second pusher indexes the units from the first loop to an empty shelf on loop 17b. Limit switch 124 which corresponds to sensing unit 35 is actuated when the second loop is filled to break the loading cycle and prevent further loading.

The unload cycle is initiated when a supply of production units to the conveyor 13 fails and space is available on the conveyor leading to the consuming machine 16. This condition results when neither sensing unit 33 or 34 has its beam interrupted for more than two seconds. Under these conditions, the clamp solenoid 104 is energized, while the gate solenoid 105 is deenergized (gate 36 closed, gate 37 open), so that packages are ejected from the surge unit to the belt conveyor 13 and allowed to pass to the consuming station. Since neither sensing unit is blocked, time delay relays 99 and 100 cannot time out. The circuit to starting coil 93 is established through the DC supply 109 normally closed contacts 111–2, normally open (now closed) contacts 101–3 of relay 101 which has been cycled, the normally closed contacts 99–4 and 100–4 of relays 99 and 100 to line 97.

In a manner similar to the operation of the loading circuit, once motor 22 starts to run, the corresponding limit switch 126 closes, thus energizing the coil of latching relay 111 which causes power to be applied to DC supply directly through the normally open (now closed) contact 111–1. The cycle is locked until the cycle limit switch 126 opens which switches the energization of latching relay 113 and coil 93 back to the original circuit. So long as the condition of time delay relays 99 and 100 remain unchanged, the cycle will repeat.

The pushers are latched into the unload position by energization of the solenoid coil 107 through the normally closed contacts 99–4 and 100–4 of time delay relays 99 and 100. Solenoid 107 operates the pilot for the air valve (not shown) which controls air cylinder 91. Motor 22 is driven in a reverse direction from that of loading to index shelves filled with production units to the level of conveyor 13. The unloading pusher 28a ejects the production units onto conveyor 13, while, at the same time, packages from loop 17b are transferred to an empty shelf 18a of loop 17a by pusher 28b, the cycle will continue even though the shelves may be empty; however, if no packages are being supplied and if no conveyor discharge space is available, the surge unit will stop due to the switching of the normally open contacts 100–3 and normally close contacts 100–4 which opens the energizing circuits to both DC supplied.

FIGS. 9–15 illustrate a preferred embodiment of the present invention wherein the surge unit is of a stacker type, i.e., production units are stored in a stacked arrangement, one above the other, and feed-in and feed-out of units from the stack in from the bottom.

Figure 9:
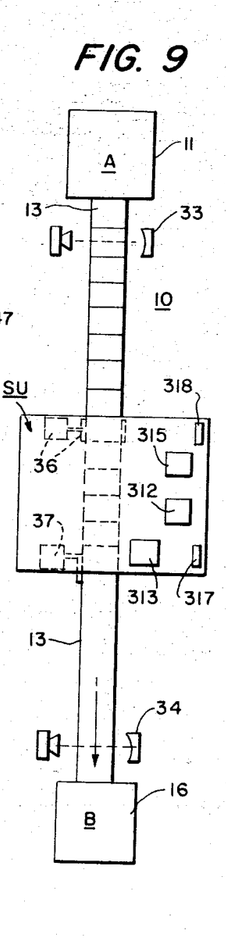
FIGS. 9 and 11 illustrate respectively a diagrammatic and fragmentary plan view of a preferred embodiment of the present invention wherein the surge unit is of a stacker type.

Referring to FIG. 9 it should be apparent that the general operation of a stacker type surge system is similar to that of the citrculating type. Production units are passed from a supplying machine 11 at a first operating station A of production line 10 to a consuming machine 16 along belt conveyor 13. Sensing unit 33 is positioned ahead of the storage apparatus on the input side to sense a back-up of packages. Sensing unit 34 is positioned beyond the storage apparatus on the output side to sense a back-up of packages which might occur due to a breakdown at the consuming station B. Solenoid operated clamp gate 36 is disposed at the input to the stacker surge unit and stop gate 37 is disposed at the output side. Gates 36 and 37 alternate position to pass packages or production units 12 into and out of the surge unit in groups.

It should be apparent that adjustment of the timing of a cycle is dependent on several factors such as, for example, the size of production units and speed of the conveyor. In handling cereal packages of the miniature single portion type, packages are bunched in groups of 6 and the detecting units are set to operate when a predetermined condition exists for more than two seconds. At a conveyor speed of 90 feet per minute, a group of 6 such packages will pass a detecting unit in less than 1.5 seconds.

As in the case of the circulating surge unit, three cycles of operation are provided: a normal cycle, a load cycle and an unload cycle. In the normal cycle, when sensing unit 33 has its beam interrupted for more than two seconds and if the beam of sensing unit 34 is not interrupted for more than 2 seconds, gates 36 and 37 will be opened to allow a group of 6 packages to be released to the consuming machine while another group of packages from the supplying machine 11 is admitted to the surge unit. The load cycle is initiated upon a back-up along the belt conveyor 13 which is sensed by unit 34, while the unload cycle is initiated when the supply of packages from the supplying machine is too low to cause actuation of sensing unit 33.

The stacking operation is diagrammatically illustrated in FIGS. 10a–10d. Packages carried on conveyor 13 are stacked within a magazine or chute 200 formed by plates 201 and 202. Plates 201 and 202 extend vertically for a short distance and then are inclined in one direction. In this manner, greater stability is added to the stack by causing the packages, after several groups have been stacked, to shift and be supported on the inclined plate 201. Stacking and unstacking of the packages is controlled by three cam-operated elements 203–205. Elements 203 and 204 are pushers which sweep packages onto and off the belt conveyor 13 while element 205 is an elevator which operates in conjunction with pusher 203 to cause packages to be stored in magazine 200.

Figure 10A:
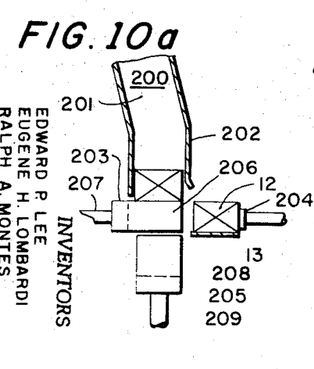
FIGS. 10a–10d diagrammatically illustrate operation of the pusher and elevator elements for a load cycle.
Figure 10B:
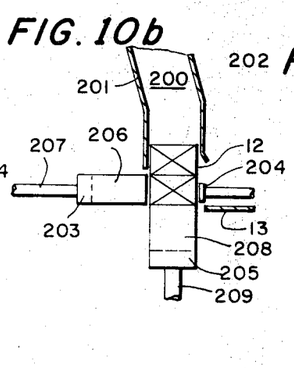
Figure 10C:
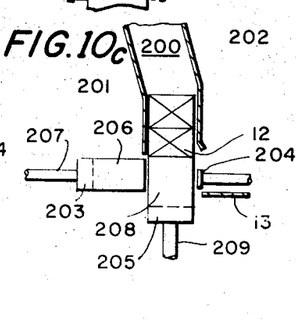
Figure 10D:
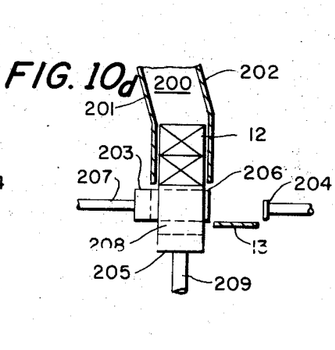
Figure 11:
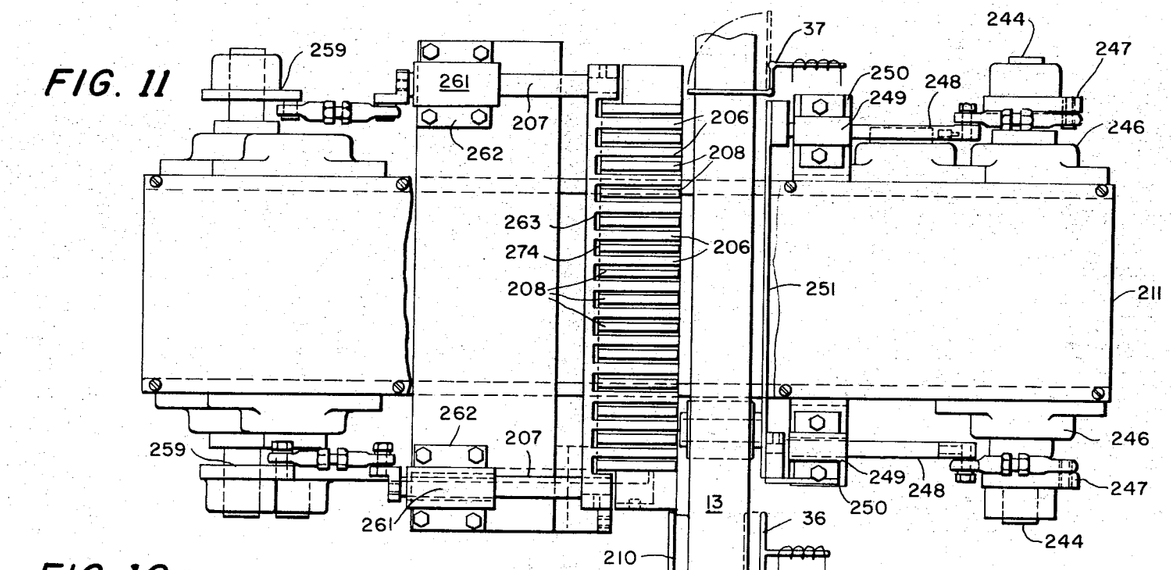

Referring to FIG. 10a, a single group of packages is shown stored within magazine 200 and supported on a plurality of spaced fingers 206. Fingers 206 are supported to actuating arm 207 of pusher 203 and adapted for reciprocatory movement therewith adjacent one side of belt conveyor 13. Pusher 204 is disposed to the other side of the belt conveyor and adapted to be actuated to sweep packages from the belt conveyor 13 to the top of cam actuated elevator 205. Elevator 205 is adapted for vertical reciprocatory movement and includes a plurality of spaced fingers 208 mounted on shaft 209 so as to support packages 12. As the packages are pushed off belt 13 by pusher 204, pusher 203 is retracted to make room for the packages which are supported on the fingers 208 of elevator 205 as shown in FIG. 10b. Elevator 205 is actuated to lift the packages, together with the previously stored packages, as shown in FIG. 10c. At the top of the stroke of elevator 205, pusher 203 is moved forward so that fingers 206 intermesh with fingers 208 and are positioned under the packages as shown in FIG. 10d. As elevator 205 is lowered, the stack of packages are supported on fingers 206.

For unloading of the magazine, elevator 205 is raised to lift the packages from the fingers 206 and pusher 203 is retracted from beneath the stack of packages. Elevator 205 is then lowered and when it reaches the bottom of its stroke, pusher 203 is actuated to move forward and push the lower layer of packages onto belt 13. Plate 202 prevents the second layer of packages from being shifted out of the magazine during the unload stroke of pusher 203 and pusher 204 is maintained in its retracted position.

The mechanical details of a stacker type surge unit are shown in FIGS. 11–15. Belt conveyor 13 is driven independently from the surge unit by pulley 210. Frame member 211 supports a gear head motor 212 which drives through a mechanical clutch 213 main drive shaft 214 rotatably supported by pillow blocks 215 and 216. Shaft 214 has keyed thereto sprocket 217 which is operatively connected through a chain drive to drive sprocket 218 keyed to shaft 219. Shaft 219 is coupled through a single revolution clutch 220 to drive sprocket 221 keyed to output shaft 222. Sprocket 221 in turn drives sprocket 223 on shaft 224 through another chain drive element 225. A common chain drive including sprocket 226 on shaft 224, sprocket 229 on shaft 228 and sprocket 227 on shaft 230 is utilized to drive shafts 224, 228, and 230 which support, respectively, cams 231, 232 and 233 arranged to actuate pusher 204, elevator 205 and pusher 203.

Figure 12:
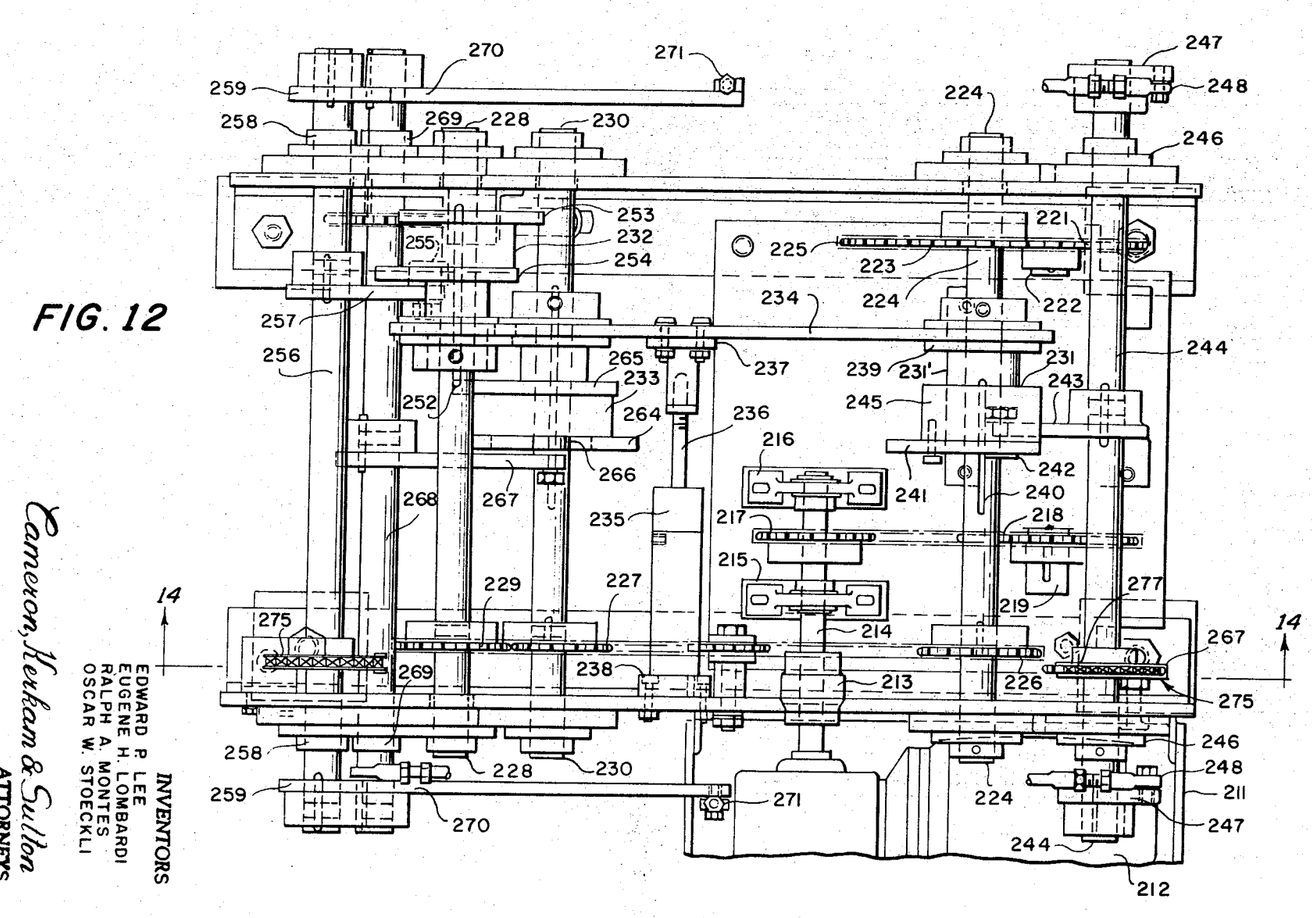
FIG. 12 is a plan view of an inclined stacking surge unit with the top removed.
Figure 13:
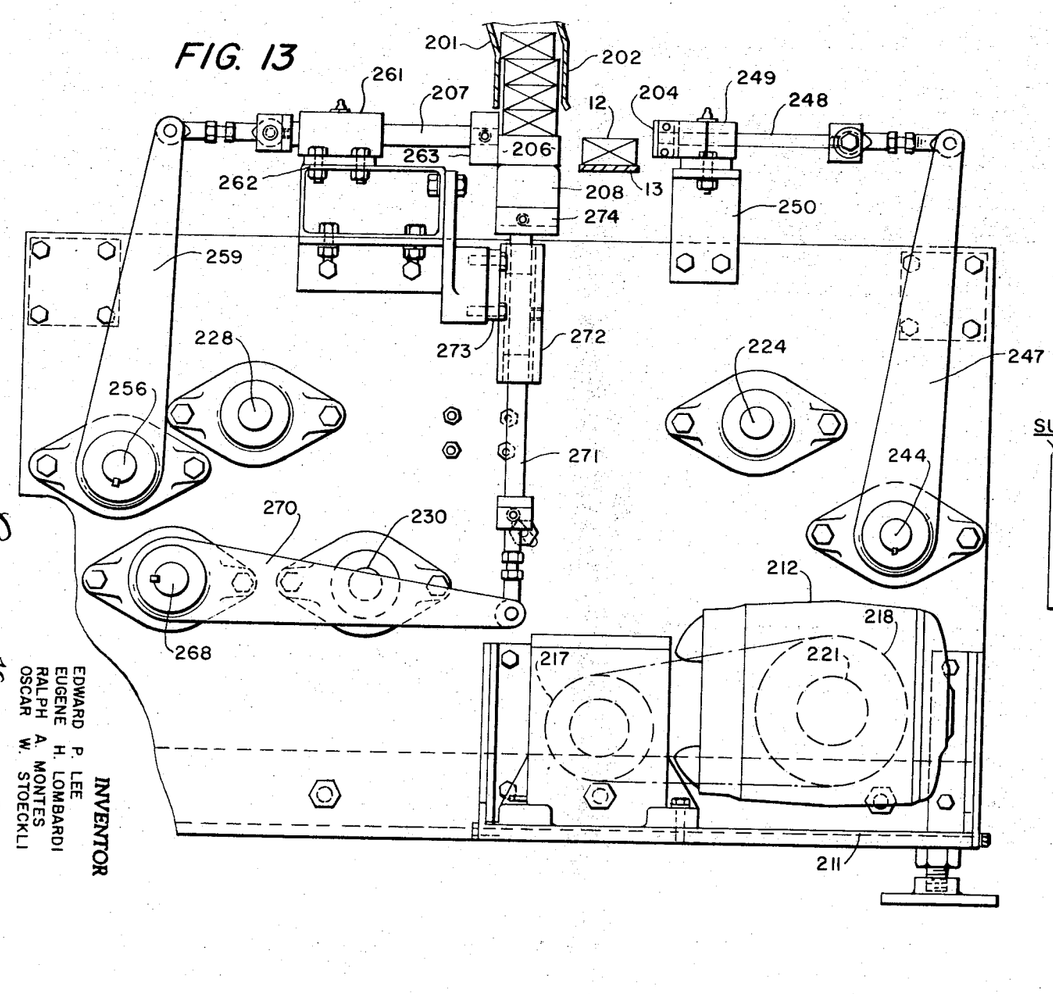
FIG. 13 is an elevational view of an inclined stacking surge unit.

Cams 231, 232 and 233 are shifted between the load and unload cycles to effect proper movement of the pushers 203, 204 and elevator 205. To this end, cam 231, 232 and 233 are mounted on yoke 234. Yoke 234 is caused to shift axially by a controlled air cylinder 235 relative to shafts 224, 228 and 230. Cylinder 235 is controlled in accordance with the nature of the cycle, i.e., loading or unloading and has its operating arm 236 clamped to yoke 234 by clamp 237. The other end of the cylinder 235 is secured to the frame by clamp 238.

Cam 231 includes a sleeve member 231′ which is connected to yoke 234 by collar 239 and mounted for axial movement along keyway 240 on shaft 224. Advantageously, cam 231 is forced to rotate along with the shaft 224 by providing sleeve member 231′ with a rib or pin (not shown) which extends into the keyway 240. Cam surface 241 cooperates with roller or cam follower 242 carried on rock arm 243 mounted on rock shaft 244. Cam 231 also includes a constant radius surface 245 which engages follower 242 when the yoke 234 is shifted to the unload cycle. Although the surfaces present different contours, it can be readily seen from FIG. 14 that at the angular position shown the radii of surfaces 241 and 245 are equal so as to permit shifting of the follower from one surface to the other. In this manner, pusher 204 is maintianed stationary during the unload cycle. Shaft 244 is supported for limited rotation by bearing assembly 246 on frame 211. Opposite extremities of shaft 244 have secured thereto an arm 247 each of which has pinned at its end a pusher actuating bar 248. Actuating bars 248 are slidingly supported in sleeve bearings 249 mounted to brackets 250. Pusher plate 251 extends between the bars 248 and adjacent belt 13 so that rotation of shaft 244 by rock arm 243 causes the pusher plate to transfer packages from the belt to the elevator.

Figure 14:
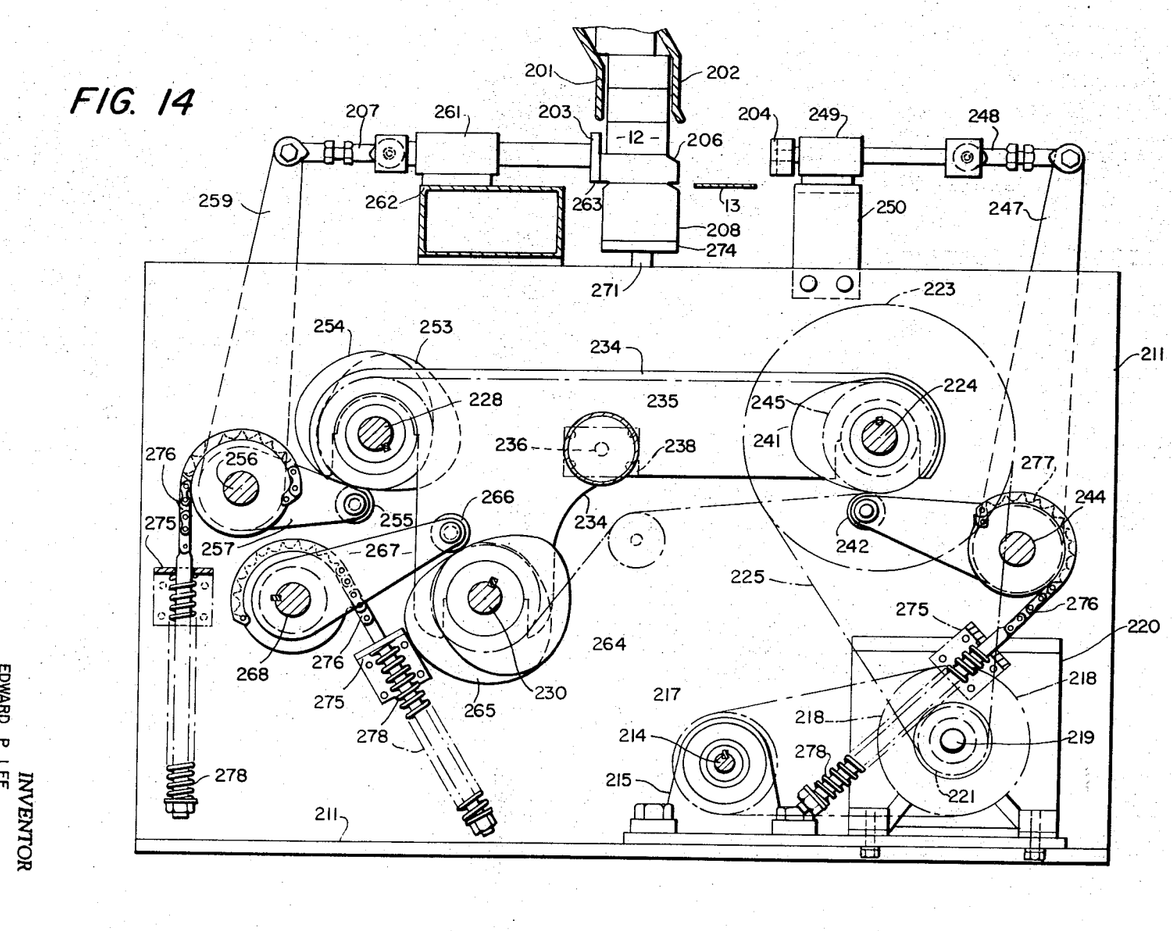
FIG. 14 is an elevational view of an inclined stacking surge unit taken along lines 14—14 of FIG. 12.

Cam 232 is similarly mounted to shaft 228 along a keyway 252 which allows axial movement thereof upon shifting of the yoke 234. Cam 232 includes a pair of spaced cam surfaces 253 and 254 which cooperate with cam follower 255 operatively connected to rock shaft 256 which in turn operates pusher 203.

To this end, follower 255 is carried on rock arm 257 keyed to shaft 256. Shaft 256 is supported for limited rotation in bearing assemblies 258 on frame 211 and has keyed at its extremities arm members 259, each of which has pinned at its end a pusher actuating bar 207. Bars 207 are slidingly supported in sleeve bearings 261 secured to brackets 262. Pusher plate 263 is supported between bars 207 and has affixed thereto the spaced horizontally extending fingers 206.

The cam assembly for actuating elevator 205 is similar to the cam assembly for actuating pusher 207. Cam 233 includes two cam surfaces 264 and 265, one of which engages the cam follower 266 carried on rock arm 267. Arm 267 is secured to shaft 268. Shaft 268 is supported for limited rotational movement in bearing assemblies 269 and has affixed at its extremities a pair of arm members 270 to which are connected actuating bars 271. Actuating bars 271 are supported in sleeve bearings 272 mounted to bracket 273. Plate 274 is mounted between bars 271 and supports a plurality of spaced fingers 208 which intermesh with fingers 206 of pusher 203.

Each arm follower assembly is provided with a spring tensioning mechanism 275 which includes chain linkage 276 that passes partially about and is pinned to a sprocket 277 affixed to the corresponding shaft. The other end of the chain is pinned to spring element 278 which is affixed at its lower end to the frame 211. It should be apparent that each of the cams 231–233 form part of a cam assembly which enables the changing of the relative timing of the cam driven parts by virtue of the axial shift imparted to the cam supporting yoke 234 that causes the cam follower linkage to be driven from a different cam surface.

Figure 15:
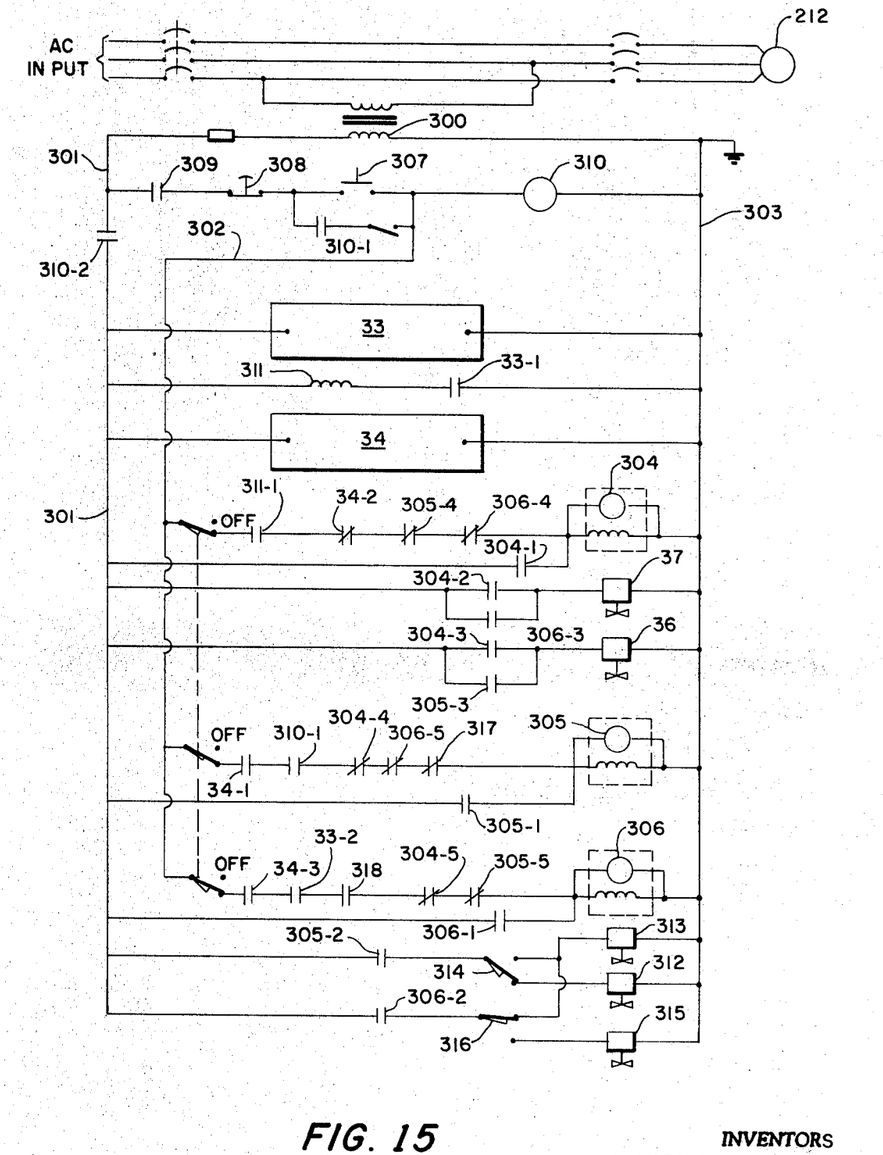
FIG. 15 is a control circuit diagram for the inclined stacking surge unit of the present invention.

The electrical requirements for the stacker type surge unit are supplied by a 440, 3 phase 60 cycle line connected to the surge unit drive motor 212. A step-down transformer 300 has its primary connected across two of the input lines and its secondary connected to the control circuits through two "hot" wires 301 and 302, and ground bus 303. Wire 301 supplies operating current to operate sensing units 33 and 34, operating coils of clamp gate 36 and gate 37, and the drive motor and clutch of timers 304, 305, and 306. Power is applied to wire 302 upon closure of the system start switch 307 through the normally closed stop switch 308 and belt drive interlock contacts 309. Upon opening of switch 308, power is maintained on line 301 for approximately 4.5 seconds through contacts 310–1 of time delay relay 310 in order to insure completion of the mechanical cycle of the stacker and timing out of the individual control timers.

The sensing units 33 and 34 may be of the photoelectric control type that includes a photoelectric amplifier incorporating an electronic timer and control relay. The operating sequence is such that when the light beam is interrupted, the amplifier starts an adjustable timing cycle. If the beam is interrupted for a sufficient period to allow the timer to complete the predetermined period set for the cycle, the control relay is actuated. If the light beam is restored before the timing cycle is completed, the timer is reset and the control relay remains deenergized. Such devices are well known and commercially available from the Standard Instrument Corp. of New York, N.Y. under the name of Photoelectric Amplifier with Forward Delay. Accordingly, the details thereof will not be described.

In operation, if sensing unit 33 is blocked for two seconds, contacts 33–1 close to energize relay 311 which in turn closes its contacts 311–1 in the circuit of timer 304. If unit 34 is not blocked for more than 2 seconds, its associated timer relay is not energized and contacts 34–2 remain closed. Timer 304 is therefore energized through normally closed contacts 305–4. Holding contacts 304–1 close together with contacts 304–2 and 304–3 which apply power to the energizing coils of clamp gate 36 and gate 37 causing the gates to pass packages in a normal cycle. Contacts 304–4 and 304–5 open when contacts 304–1 close to prevent any other cycle until timer 304 has times out, thus indicating that its cycle is complete.

Timer 305 controls the load cycle and is energized when the normally open contacts 34–1 of unit 34 are closed. This occurs when sensing units 33 and 34 are blocked for two seconds. Timer contacts 305-2 are closed to connect either solenoid 312 or solenoid 313 across line 301 and ground bus 303 depending on the position of limit switch 314. Solenoid 312 actuates the cylinder 235 which shifts yoke 234 and sets the cams 231 and 232 in the load position and solenoid 313 trips the single revolution clutch 220. Contacts 305-3 operate the solenoid or energizing coil of clamp gate 36 to open the gate to admit packages to the surge unit. Contacts 305-4 and 305-5 are opened when contacts 305-1 close to prevent any other cycle until timer 305 has timed out, thus indicating that its cycle is complete.

Timer 306 controls the load cycle and is operated when contacts 34-3 close. This occurs when sensing unit 34 is not blocked for approximately 5 seconds and sensing unit 33 is not blocked for 2 seconds. Timer 306 is energized through holding contacts 306-1, while contacts 306-2 close to energize solenoid 315 and set the cams in the unload position through limit switch 316. This shifts the yoke while contacts 306-3 close to operate gate 37 to release packages from the surge unit. Contacts 306-4 and 306-5 are opened when contacts 306-1 close to prevent any other cycle until timer 306 has timed out, thus indicating that its cycle is complete.

After the cams have been shifted or set to a load or unload position, the single revolution clutch 220 is controlled by the position of limit switches 314 and 316. A high level switch 317 is disposed in the magazine and electrically connected in series with the load timer 305 to break this load circuit when the magazine is full. A low level switch 318 is similarly connected in series with the unload timer 306.

It should be apparent that either control circuit may be adapted to either mechanical form by minor changes in wiring; however, for the purpose of this description, the control circuits have been shown as separate systems.

Although the invention and its operation have been described with reference to specific embodiments various modifications will suggest themselves to those skilled in the art, and it is intended by the appended claims to cover all such modifications which fall within the scope of the invention.

We claim:

1. An assembly for changing the relative timing of a cam driven follower linkage comprising at least two cam elements, each having a plurality of cam surfaces presenting different cam contours, a separate shaft supporting each cam element, means for rotatably driving the separate shafts in timed relationship, a follower linkage for each cam element operably connected to one of said plurality of cam surfaces, a shiftable yoke slidingly mounted on the separate shafts, means for mounting said cam elements for sliding movement with said yoke and for rotation with the corresponding shafts and means for shifting said yoke to cause said cam elements to be displaced such that said follower linkage is operably connected to another of the cam surfaces of a corresponding cam to thereby change the relative timing of the cam driven linkage.

2. An assembly as set forth in claim 1 wherein the surfaces of each said cam elements in at least one angular position thereof have the same radial dimension.

3. An assembly as set forth in claim 2 wherein at least one of said cam surfaces of each cam element has a variable radial dimension.

4. An assembly for changing the relative timing of cam driven follower linkages comprising a plurality of cam elements each having a pair of cam surfaces presenting different cam contours, a separate shaft for each said cam elements, means for rotatably driving the separate shafts in timed relationship, a follower linkage for each cam element operably connected to one of the surfaces of an associated cam element, a shiftable yoke mounted for sliding movement along the axes of the shafts, means for mounting said cam elements to said yoke for movement therewith and for rotation with the corresponding shaft, means for shifting said yoke to cause said cam elements to be displaced such that the follower linkage for each cam element is operably connected to the other of the surfaces to thereby change the relative timing of the cam driven linkages.

5. An assembly as set forth in claim 4 wherein at least one cam surface of each pair of cam surfaces presenting different cam contours has a variable radial dimension.

6. An assembly for changing the relative timing of cam driven linkages comprising a plurality of shafts supported in separate planes and adapted to be rotatably driven in timed relationship, the axes of said shafts being parallel, a yoke slidingly supported on said shafts, for each shaft an associated cam element having a pair of cam surfaces presenting different cam contours, at least one surface of each pair having a variable radial dimension, both surfaces of an element in at least one angular position thereof having the same radial dimension, means for mounting each said cam elements to said yoke for movement therewith in a direction along the axis of the associated shaft, each of said cam elements adapted to be rotatably driven by the associated shaft, a follower linkage for each cam element including a biased follower arm operably connected to one of the cam surfaces and means for shifting said yoke along the axis of shaft shafts to cause the follower arm of each linkage to be operatively connected to the other of the cam surfaces to thereby change the relative timing of the cam driven linkages.

7. An assembly as set forth in claim 1 wherein said means for shifting said yoke comprises a cylinder having an operating arm adapted to be displaced from a retracted position to an extended position upon activation of said cylinder, means for connecting said arm to said yoke and means for controlling the actuation of said cylinder.

8. An assembly as set forth in claim 4 wherein said means for shifting said yoke comprises a cylinder having an operating arm adapted to be displaced from a retracted position to an extended position upon activation of said cylinder, means for connecting said arm to said yoke and means for controlling the actuation of said cylinder.

9. An assembly as set forth in claim 6 wherein said means for shifting said yoke comprises a cylinder having an operating arm adapted to be displaced along a line parallel to the axis of said shafts from a retracted position to an extended position upon actuation of said cylinder, means for connecting said arm to said yoke and means for controlling the actuation of said cylinder.

References Cited
UNITED STATES PATENTS

| | | | |
|---|---|---|---|
| 702,038 | 6/1902 | Thomson | 74—568X |
| 819,202 | 5/1906 | Blackwell | 74—568X |
| 1,365,541 | 1/1921 | Rankin | 74—568 |
| 1,651,402 | 12/1927 | Midgley | 74—568X |
| 1,688,164 | 10/1928 | Tarrant | 74—568X |
| 1,720,189 | 7/1929 | Jackson | 74—568X |
| 2,277,153 | 3/1942 | Scott et al. | 74—568 |

FRED C. MATTERN, Jr., Primary Examiner

F. D. SHOEMAKER, Assistant Shoemaker

U.S. Cl. X.R.

74—53

PO-1050
(5/69)

UNITED STATES PATENT OFFICE
CERTIFICATE OF CORRECTION

Patent No. 3,546,965           Dated December 15, 1970

Inventor(s) Edward P. Lee et al.

It is certified that error appears in the above-identified patent and that said Letters Patent are hereby corrected as shown below:

Column 1, line 40, a comma should be inserted after "ample". Column 5, line 49, "load" should be --unload--; Line 52, "3d" should be --3-D--; Line 58, "4d" should be --4-D--. Column 6, line 5, "10a" should be --18a--; Line "manurfacturing" should be --manufacturing--. Column 10, 1. 5, "citruclating" should be --circulating--. Column 11, li1 53, "maintianed" should be --maintained--. Column 14, line "shaft" should be --said--; Line 67, "Assistant Shoemaker" should be --Assistant Examiner--.

Signed and sealed this 23rd day of March 1971.

(SEAL)
Attest:

EDWARD M. FLETCHER, JR.           WILLIAM E. SCHUYLER, JR
Attesting Officer                   Commissioner of Patents